United States Patent
Schuele et al.

(10) Patent No.: US 11,083,355 B2
(45) Date of Patent: Aug. 10, 2021

(54) EXTRACTION CONNECTION SYSTEM

(71) Applicant: Robert Bosch GmbH, Stuttgart (DE)

(72) Inventors: Manfred Schuele, Sulzbach-Laufen (DE); Robert Simm, Oekingen (CH); Andreas Zurbruegg, Luterbach (CH); Michael Laett, Solothurn (CH); Hardy Schmid, Stuttgart (DE); Anna Heszler, Schwieberdingen (DE); Pasquale Oliverio, Erlinsbach (CH); Theo Tagscherer, Gaildorf (DE)

(73) Assignee: Robert Bosch GmbH, Stuttgart (DE)

( * ) Notice: Subject to any disclaimer, the term of this patent is extended or adjusted under 35 U.S.C. 154(b) by 314 days.

(21) Appl. No.: 15/730,978

(22) Filed: Oct. 12, 2017

(65) Prior Publication Data

US 2018/0028032 A1    Feb. 1, 2018

Related U.S. Application Data

(62) Division of application No. 14/428,766, filed as application No. PCT/EP2013/068215 on Sep. 4, 2013, now abandoned.

(30) Foreign Application Priority Data

Sep. 20, 2012    (DE) ...................... 10 2012 216 884.2

(51) Int. Cl.
*F16L 37/084* (2006.01)
*A47L 9/24* (2006.01)
(Continued)

(52) U.S. Cl.
CPC ............. *A47L 9/242* (2013.01); *A47L 7/0095* (2013.01); *B23Q 11/0046* (2013.01); *F16L 37/0848* (2013.01)

(58) Field of Classification Search
CPC ... F16L 37/084; F16L 37/088; F16L 37/0885; F16L 27/08; F16L 27/0804; F16L 27/0808
(Continued)

(56) References Cited

U.S. PATENT DOCUMENTS 3,468,562 A    9/1969    Chow
4,219,222 A    8/1980    Brusadin
(Continued)

FOREIGN PATENT DOCUMENTS

CN    1383369 A    12/2002
CN    1384034 A    12/2002
(Continued)

OTHER PUBLICATIONS

International Search Report corresponding to PCT Application No. PCT/EP2013/068215, dated Apr. 2, 2014 (German and English language document) (9 pages).

*Primary Examiner* — Aaron M Dunwoody
(74) *Attorney, Agent, or Firm* — Maginot, Moore & Beck LLP

(57) ABSTRACT

An extraction connection system for portable machine tools includes at least one tool connection element, at least one suction apparatus connection element, and at last one fixing unit. The at least one tool connection element is configured to be connected to the at least one suction apparatus connection element. The at least one fixing unit includes at least one movably mounted fixing element configured to fix the at least one tool connection element and the at least one suction apparatus connection element against a movement relative to each other in at least one direction.

20 Claims, 8 Drawing Sheets

(51) Int. Cl.
  *A47L 7/00* (2006.01)
  *B23Q 11/00* (2006.01)

(58) Field of Classification Search
  USPC .............................. 285/7, 305, 307, 321, 921
  See application file for complete search history.

(56) References Cited

U.S. PATENT DOCUMENTS

| | | | | |
|---|---|---|---|---|
| 4,372,650 | A * | 2/1983 | Lisfeld | G02B 7/026 |
| | | | | 359/829 |
| 4,592,388 | A * | 6/1986 | Wilcox | F16L 37/008 |
| | | | | 137/615 |
| 4,611,837 | A * | 9/1986 | Aleck | F16L 37/088 |
| | | | | 285/305 |
| 5,050,911 | A * | 9/1991 | Morrison | F16L 37/088 |
| | | | | 285/148.19 |
| 5,087,081 | A | 2/1992 | Yoon | |
| 5,681,060 | A * | 10/1997 | Berg | F16L 37/088 |
| | | | | 285/305 |
| 5,884,943 | A | 3/1999 | Katzer | |
| 6,199,913 | B1 | 3/2001 | Wang | |
| 6,467,816 | B1 | 10/2002 | Huang | |
| 6,890,004 | B2 | 2/2005 | Naito | |
| 6,904,932 | B1 | 6/2005 | Haraughty | |
| 8,251,407 | B2 | 8/2012 | Tiberghien | |
| 8,302,999 | B2 * | 11/2012 | Xu | E03C 1/0404 |
| | | | | 137/801 |
| 2002/0063426 | A1 | 5/2002 | Ose | |
| 2003/0062722 | A1 * | 4/2003 | Linhart | F16L 37/0985 |
| | | | | 285/319 |
| 2005/0093297 | A1 | 5/2005 | Gilpatrickm | |
| 2005/0121906 | A1 | 6/2005 | Tiberghien | |
| 2007/0114794 | A1 | 5/2007 | Frost | |
| 2007/0257485 | A1 | 11/2007 | Arosio | |
| 2007/0275590 | A1 | 11/2007 | Cheng | |
| 2007/0278791 | A1 | 12/2007 | Tiberghien | |
| 2010/0140923 | A1 * | 6/2010 | Hellfeier | F02M 35/10137 |
| | | | | 285/24 |
| 2011/0006514 | A1 | 1/2011 | Li | |
| 2013/0320673 | A1 | 12/2013 | Hopson | |

FOREIGN PATENT DOCUMENTS

| | | |
|---|---|---|
| CN | 1582836 A | 2/2005 |
| CN | 101004234 A | 7/2007 |
| CN | 101495267 A | 7/2009 |
| DE | 26 59 141 | 7/1978 |
| DE | 33 12 193 A1 | 10/1984 |
| DE | 201 13 222 U1 | 12/2001 |
| EP | 0 887 040 A1 | 12/1998 |
| EP | 1 255 069 A1 | 11/2002 |
| GB | 757 408 | 9/1956 |
| WO | 02/00087 A1 | 1/2002 |
| WO | 2008/003544 A1 | 1/2008 |

\* cited by examiner

EXTRACTION CONNECTION SYSTEM

This application is a divisional of co-pending U.S. patent application Ser. No. 14/428,766, filed on Mar. 17, 2015, which is a 35 U.S.C. § 371 National Stage Application of PCT/EP2013/068215, filed on Sep. 4, 2013, which claims the benefit of priority to Serial No. DE 10 2012 216 884.2, filed on Sep. 20, 2012 in Germany, the disclosures of which are incorporated herein by reference in their entirety.

BACKGROUND

Extraction connection systems for portable machine tools, which comprise a tool connection element and a suction apparatus connection element, which are provided to be connected to each other, are already known.

SUMMARY

The disclosure is based on an extraction connection system for portable machine tools, comprising at least one tool connection element and comprising at least one suction apparatus connection element, which are provided to be connected to each other, in particular one plugged into the other.

It is proposed that the extraction connection system comprises at least one fixing unit, which comprises at least one movably mounted fixing element, for fixing the tool connection element and the suction apparatus connection element against a movement relative to each other in at least one direction. "Provided" should be understood in particular as meaning specially designed and/or specially equipped. The tool connection element, in particular for connection to the suction apparatus connection element, has at least one configuration corresponding to the suction apparatus connection element, such as, for example, an internal size corresponding to an external size of the suction apparatus connection element or an external size corresponding to an internal size of the suction apparatus connection element. The tool connection element and the suction apparatus connection element are preferably connectable to each other by means of a plug-in connection. The extraction connection system is particularly preferably provided for connecting a portable machine tool to a dust extraction device, in particular a vacuum cleaner, for extracting abrasion dust arising during a machining of a work piece by means of the portable machine tool. The term "tool connection element" is provided here to define in particular an element of the extraction connection system, which element, for extracting abrasion dust arising during a machining of a work piece by means of the portable machine tool, is arranged on the portable machine tool, in particular is formed integrally on a machine tool housing of the portable machine tool or is mounted movably on the machine tool housing. The tool connection element is preferably in the form of a tool-side connecting branch. "Integrally" is provided to be understood in particular as meaning at least integrally connected, for example by means of a welding process, an adhesive bonding process, a molding-on process and/or another process appearing expedient to a person skilled in the art, and/or is advantageously understood as meaning molded in one piece, such as, for example, by production from a casting and/or by production in a single-component or multi-component injection molding process, and advantageously from a single blank. The term "suction apparatus connection element" is provided here to define in particular an element which, for extraction of abrasion dust arising during a machining of a work piece by means of the portable machine tool, is arranged on the dust extraction device, in particular on a suction hose of the dust extraction device. The suction apparatus connection element is preferably in the form of a suction-apparatus-side connecting branch.

The term "fixing unit" is provided here in particular to define a unit which, in at least one state, fixes two elements and/or units, which are formed separately from each other, relative to each other, in particular on each other, in at least one position along at least one direction by means of an interlocking and/or frictional connection. The fixing unit is particularly preferably in the form of an interlocking fixing unit. The expression "mounted movably" is provided to be understood here as meaning in particular a mounting of the fixing element on a further element, wherein the fixing element has a movement option relative to the further element along at least one axis along a distance of greater than 0.5 mm, preferably greater than 1 mm and particularly preferably greater than 2 mm, and/or a movement option, in particular relative to the further element, by an angle of greater than 10°, preferably greater than 20° and particularly preferably greater than 30° about at least one axis. The fixing element is preferably formed separately from the tool connection element and the suction apparatus connection element. The fixing element here is preferably in the form of a movably mounted latching element. However, it is also conceivable that, in an alternative configuration, the fixing element is in the form of a magnetic element which is mounted movably on the tool connection element and/or on the suction apparatus connection element and, after the tool connection element and the suction apparatus connection element are connected, is movable into a fixing position. However, it is also conceivable here for the fixing element which is in the form of a magnetic element to be arranged in a positionally fixed manner on the tool connection element and/or on the suction apparatus connection element and for said fixing element to fix the tool connection element and the suction apparatus connection element relative to each other by means of a magnetic action of force.

The tool connection element and the suction apparatus connection element are preferably fixed by means of the fixing unit against a movement along and counter to a connecting direction of movement of the tool connection element and the suction apparatus connection element. A "connecting direction of movement" is provided here to be understood as meaning in particular a direction of movement of the tool connection element and/or of the suction apparatus connection element, along which the tool connection element and/or the suction apparatus connection element are/is moved to form a connection. By means of the configuration according to the disclosure of the extraction connection system, a secure connection between the tool connection element and the suction apparatus connection element can advantageously be ensured. In addition, an extraction connection system which can be operated in a simple manner can advantageously be realized. A high level of operating convenience for an operator can thus advantageously be made possible.

Furthermore, it is proposed that the fixing element is mounted movably on the suction apparatus connection element. However, it is also conceivable for the fixing element to be mounted movably on the tool connection element. The configuration according to the disclosure makes it advantageously possible to realize a fixing element which can be operated easily and safely and is operable conveniently to form a connection and/or to separate the connection of the tool connection element and of the suction apparatus connection element.

It is furthermore proposed that the fixing element is arranged in a receiving recess of the suction apparatus connection element. The receiving recess can be formed here as a groove or as a continuous material cutout. In a configuration of the receiving recess as a continuous material cutout, the fixing element reaches through the receiving recess in order to fix the tool connection element and the suction apparatus connection element in at least one state. A secure arrangement of the fixing element on the suction apparatus connection element can thus advantageously be achieved.

In addition, it is proposed for the fixing element to be of annular design. The fixing element here can be in the form of a closed circular ring or a circular ring segment. The annular fixing element is mounted movably on the suction apparatus connection element preferably in a receiving recess in the form of a groove, or in a receiving recess in the form of a continuous material cutout. A compact arrangement of the fixing element, in particular on the suction apparatus connection element, can advantageously be achieved.

Furthermore, it is proposed that the fixing element has at least one articulation region. An "articulation region" is provided here to be understood as meaning in particular a region of the fixing element that has a lower flexural rigidity in comparison to further regions directly adjacent to the region and in particular is of flexurally soft design or is in the form of a joint. The articulation region is particularly preferably in the form of a film hinge region. A movement option of the fixing element for fixing or for releasing a fixing of the tool connection element and the suction apparatus connection element can advantageously be achieved cost effectively.

Furthermore, it is proposed that the tool connection element comprises at least two connecting regions, which are different from each other, as viewed along a connecting direction of movement of the tool connection element and/or of the suction apparatus connection element. The connecting regions preferably have extents which differ from one another along a direction running at least substantially perpendicular to the connecting direction of movement. It can thus advantageously be ensured that a connection, in particular a frictional connection, of the tool connection element to already existing suction apparatus connection elements, in particular to rubber sleeves of already existing dust extraction devices, can be achieved. It is therefore advantageously possible to achieve compatibility of the tool connection element according to the disclosure with already existing dust extraction devices.

In addition, it is proposed that the fixing unit comprises at least one spring element which acts upon an operating element of the fixing unit with a spring force. A "spring element" is provided to be understood as meaning in particular a macroscopic element which has at least two ends which are spaced apart from each other and, in a normal operating state, are elastically movable relative to each other along a movement distance, wherein the movement distance is at least greater than 0.5 mm, in particular greater than 1 mm, and is preferably greater than 2 mm and particularly advantageously is greater than 3 mm, and which element in particular produces a counterforce which is dependent on an elastic movement of the ends relative to each other, is preferably proportional to the elastic movement of the ends relative to each other and which opposes the variation. A "macroscopic element" is provided to be understood as meaning in particular an element with an extent of at least 1 mm, in particular of at least 5 mm and preferably of at least 10 mm. The spring element is preferably in the form of a helical compression spring. However, it is also conceivable for the spring element to have a different configuration appearing expedient to a person skilled in the art, for example a helical tension spring, a leg spring, a volute spring, a disk spring, etc. By means of the configuration according to the disclosure, an automatic movement of the operating element into at least one position can advantageously be achieved. In addition, a secure positioning of the fixing element via the operating element in at least one position can advantageously be achieved.

Furthermore, it is proposed that the fixing unit comprises at least one operating element which, in at least one state, enables a movement option of the fixing element into a release position. A fixing unit which is convenient to operate and which permits a structurally simple enabling of a movement option of the fixing element can advantageously be achieved.

Furthermore, it is proposed that the fixing unit comprises at least the operating element which is of annular design. The operating element here is preferably in the form of an operating sleeve. However, it is also conceivable for the operating element to have a different configuration appearing expedient to a person skilled in the art, for example a configuration as a sliding element, as a press element, as a push button element, etc. The configuration according to the disclosure makes it advantageously possible for a plurality of fixing elements of the fixing unit to be actuated by one operating element. Furthermore, an operating element which can be comfortably grasped by an operator can be realized.

In addition, it is proposed that the tool connection element has at least one fixing element decoupling surface which, at least in one state, moves the fixing element into a release position. The fixing element decoupling surface is particularly preferably in the form of an oblique surface which has an orientation inclined with respect to a longitudinal axis of the tool connection element. The tool connection element is preferably formed rotationally symmetrically with respect to the longitudinal axis of the tool connection element. By means of the configuration according to the disclosure, a movement of the fixing element in at least one state into a release position can be realized in a structurally simple manner.

Furthermore, the disclosure is based on a tool connection element of an extraction connection system according to the disclosure. Already existing portable machine tools can advantageously be retrofitted with a tool connection element according to the disclosure.

Furthermore, the disclosure is based on a portable machine tool comprising a tool connection element according to the disclosure. A "portable machine tool" is provided to be understood here as meaning in particular a machine tool for machining work pieces, which machine tool can be transported by an operator without the use of a transportation machine. The portable machine tool has in particular a mass of less than 40 kg, preferably less than 10 kg and particularly preferably less than 5 kg. The portable machine tool is particularly preferably in the form of a grinding machine. However, it is also conceivable for the portable machine tool to have a different configuration appearing expedient to a person skilled in the art, for example a configuration as a circular saw, a planing machine, a jigsaw, a power drill, etc. By means of the configuration according to the disclosure, the portable machine tool can advantageously be securely connected to a dust extraction device, as a result of which advantageous extraction of abrasion dust arising during a machining of a work piece by means of the portable machine tool can be made possible.

In addition, the disclosure is based on a suction apparatus connection element of an extraction connection system according to the disclosure. Already existing dust extraction devices can advantageously be retrofitted with a suction apparatus connection element according to the disclosure.

Furthermore, the disclosure is based on a machine tool machining system with a portable machine tool according to the disclosure and with a dust extraction device according to the disclosure. By means of the configuration according to the disclosure of the machine tool machining system, an extraction of abrasion dust during a machining of a work piece can advantageously be made possible. A health-damaging raising of dust can therefore advantageously be countered.

The extraction connection system according to the disclosure, the tool connection element according to the disclosure, the portable machine tool according to the disclosure, the suction apparatus connection element according to the disclosure, the dust extraction device according to the disclosure and/or the machine tool machining system according to the disclosure are/is not provided to be restricted here to the use and embodiment described above. In particular, in order to perform a function described herein, the extraction connection system according to the disclosure, the tool connection element according to the disclosure, the portable machine tool according to the disclosure, the suction apparatus connection element according to the disclosure, the dust extraction device according to the disclosure and/or the machine tool machining system according to the disclosure may have a number of individual elements, components and units differing from the number stated herein.

BRIEF DESCRIPTION OF THE DRAWINGS

Further advantages emerge from the description below of the drawing. The drawing illustrates exemplary embodiments of the disclosure. The drawing, the description and the claims contain numerous features in combination. A person skilled in the art will expediently also consider the features individually and combine them to form further meaningful combinations.

In the drawings.

DETAILED DESCRIPTION

Figure 1:
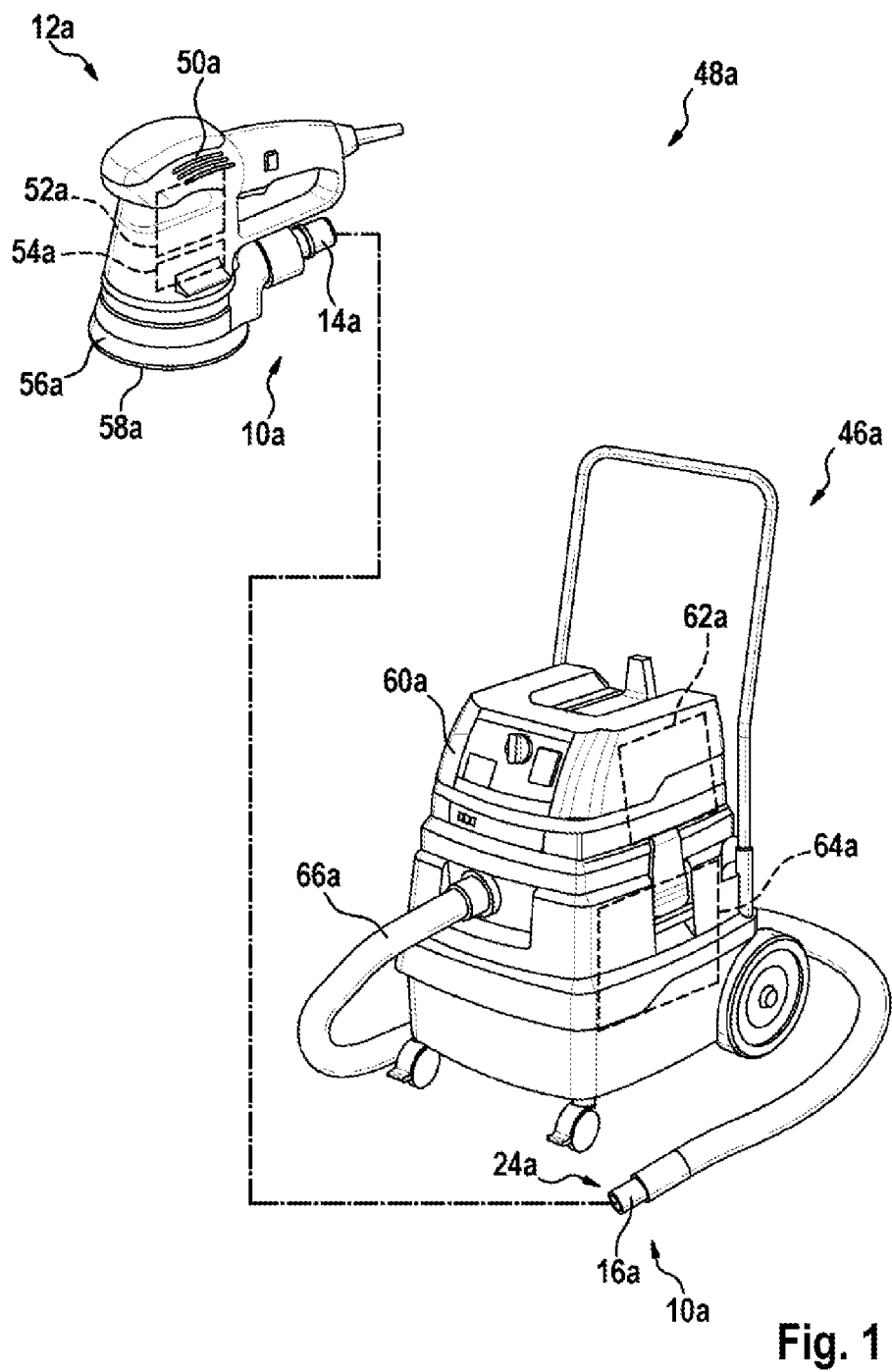
FIG. 1 is a schematic illustration of a machine tool machining system according to the disclosure with a portable machine tool according to the disclosure and with a dust extraction device according to the disclosure.

FIG. 1 shows a machine tool machining system 48a which comprises at least one portable machine tool 12a and at least one dust extraction device 46a. The portable machine tool 12a is in the form of a grinding machine. The portable machine tool 12a here comprises a machine tool housing 50a which encloses a drive unit 52a of the portable machine tool 12a and a transmission unit 54a of the portable machine tool 12a. The drive unit 52a and the transmission unit 54a are provided for driving a machining tool 58a, which is arranged on a tool holding fixture 56a of the portable machine tool 12a, in a rotating and/or oscillating manner. The machining tool 58a is in the form of an abrasive disk. Furthermore, the portable machine tool 12a comprises a tool connection element 14a of an extraction connection system 10a in the region of the tool holding fixture 56a. The tool connection element 14a is designed here as a connecting branch which is provided to be connected to a suction apparatus connection element 16a of the extraction connection system 10a, said suction apparatus connection element being formed in a manner corresponding to the connecting branch. The tool connection element 14a here has a cylindrical configuration.

The dust extraction device 46a is in the form here of a transportable vacuum cleaner. The dust extraction device 46a here comprises at least one housing 60a which encloses a drive unit 62a and a collecting container 64a of the dust extraction device 46a. Furthermore, the dust extraction device 46a comprises at least one dust extraction hose 66a. The dust extraction hose 66a is connectable in terms of flow to the collecting container 64a. The suction apparatus connection element 16a of the extraction connection system 10a is arranged on the dust extraction hose 66a for connection of the dust extraction device 46a to the portable machine tool 12a. The suction apparatus connection element 16a therefore forms a connection element corresponding to the tool connection element 14a designed as a connecting branch.

The tool connection element 14a and the suction apparatus connection element 16a together form a plug-in connection for connection of the portable machine tool 12a and the dust extraction device 46a to provide dust extraction of abrasion dust arising during a machining of a work piece by means of the portable machine tool 12a. The extraction connection system 10a for the portable machine tool 12a therefore comprises at least the tool connection element 14a and at least the suction apparatus connection element 16a, which are provided to be connected to each other.

Furthermore, the extraction connection system 10a comprises at least one fixing unit 24a, which comprises at least one movably mounted fixing element 18a, for fixing the tool connection element 14a and the suction apparatus connection element 16a against a movement relative to each other in at least one direction (FIGS. 2a to 4). The fixing element 18a is mounted movably on the suction apparatus connection element 16a. For this purpose, the suction apparatus connection element 16a comprises at least one receiving recess 26a. The fixing element 18a is therefore arranged in the receiving recess 26a of the suction apparatus connection element 16a. The receiving recess 26a is in the form of a groove in which the fixing element 18a is arranged. The receiving recess 26a which is in the form of a groove extends here in a circular-ring-shaped manner along an outer circumference of the suction apparatus connection element 16a. In a mounted state, the fixing element 18a is arranged between two web-shaped edge regions of the suction apparatus connection element 16a, said edge regions bounding the receiving recess 26a, as viewed along a longitudinal axis 110a of the suction apparatus connection element 16a. In a state of the tool connection element 14a and of the suction apparatus connection element 16a in which they are connected to each other, the longitudinal axis 110a of the suction apparatus connection element 16a runs coaxially with respect to a longitudinal axis 108a of the tool connection element 14a. The fixing element 18a is of annular design. The fixing element 18a here is in the form of a circular ring segment which extends along an angular range of less than 360°.

Figure 2A:
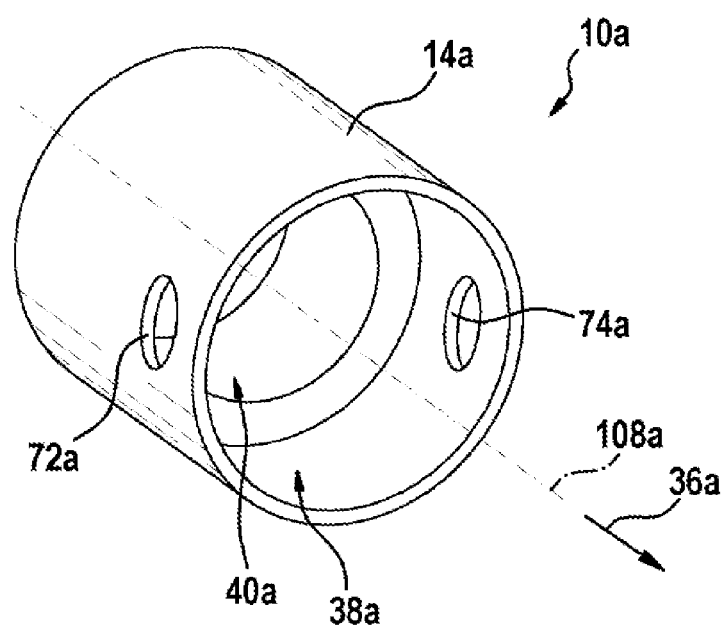
FIG. 2a is a schematic illustration, in a detail view, of a tool connection element according to the disclosure of an extraction connection system according to the disclosure.
Figure 5:
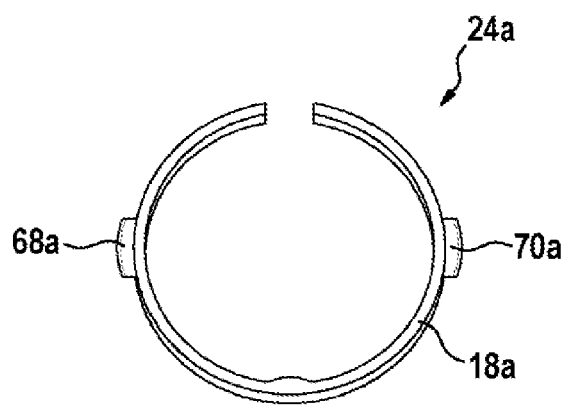
FIG. 5 is a schematic illustration, in a detail view, of a fixing element of a fixing unit of the extraction connection system according to the disclosure.

In order to fix the suction apparatus connection element 16a on the tool connection element 14a, the fixing element 18a has at least one latching extension 68a. Overall, the fixing element 18a comprises two latching extensions 68a, 70a. However, it is also conceivable for the fixing element 18a to comprise a number of latching extensions 68a, 70a differing from two. The latching extensions 68a, 70a extend radially from the fixing element 18a in a direction facing away from the fixing element 18a. In addition, the latching extensions 68a, 70a are arranged on the fixing element 18a in a manner offset relative to each other by 180°. The latching extensions 68a, 70a are thus arranged in a uniformly distributed manner on the fixing element 18a (FIG. 5). In a state of the suction apparatus connection element 16a in which the latter is connected to the tool connection element 14a, the latching extension 68a, 70a engage in latching recesses 72a, 74a of the tool connection element 14a. The latching recesses 72a, 74a have a configuration here corresponding to the latching extensions 68a, 70a. The latching recesses 72a, 74a are arranged in a first connection region 38a of the tool connection element 14a. The latching recesses 72a, 74a are arranged here in the first connection region 38a in a manner offset relative to each other by 180°. The latching recesses 72a, 74a are therefore arranged in a uniformly distributed manner in the first connecting region 38a (FIG. 2a). Furthermore, the latching recesses 72a, 74a have an oval configuration. Overall, the tool connection element 14a has two connection regions 38a, 40a. The tool connection element 14a comprises at least two connection regions 38a, 40a which differ from each other, as viewed along the connecting direction of movement 36a of the tool connection element 14a and/or of the suction apparatus connection element 16a or along the longitudinal axis 108a of the tool connection element 14a. This ensures connection of the tool connection element 14a to already existing connection elements of already existing dust extraction devices (not illustrated specifically here). The connecting regions 38a, 40a have inside diameters formed differently from each other (FIG. 2a).

In order to connect the tool connection element 14a and the suction apparatus connection element 16a, an operator actuates the latching extensions 68a, 70a in the direction of the suction apparatus connection element 16a. By this means, the fixing element 18a is elastically deformed in the receiving recess 26a. After the suction apparatus connection element 16a is introduced into the tool connection element 14a along the connecting direction of movement 36a, the latching extensions 68a, 70a, as a consequence of a tensioning force caused in the fixing element 18a by the elastic deformation of the fixing element 18a, automatically move into the latching recesses 72a, 74a as soon as the latching extensions 68a, 70a are aligned with the latching recesses 72a, 74a. the tool connection element 14a and the suction apparatus connection element 16a are therefore fixed relative to each other along the connection direction of movement 36a. Rotation of the tool connection element 14a relative to the suction apparatus connection element 16a is furthermore ensured here by the movable arrangement of the fixing element 18a in the receiving recess 26a.

Figure 2B:
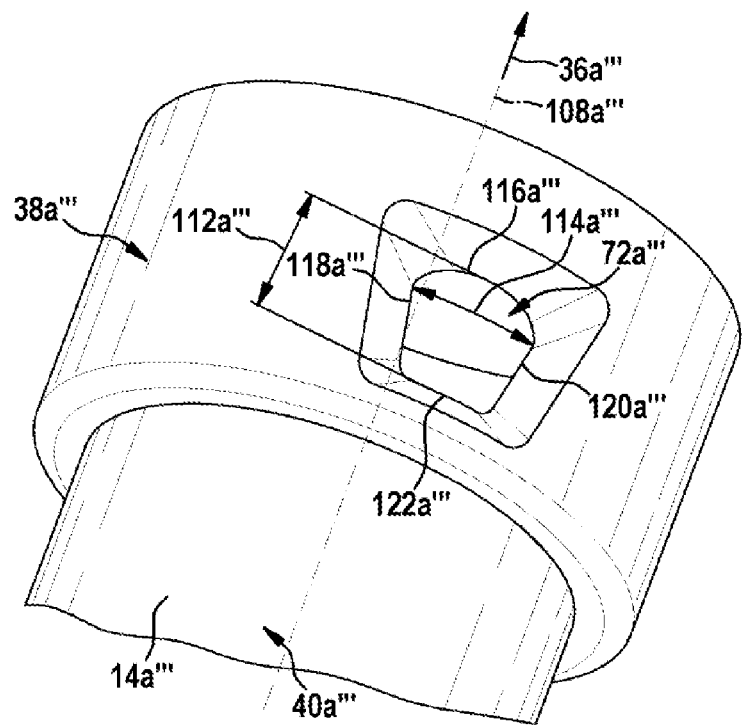
FIG. 2b is a schematic illustration, in a detail view, of an alternative configuration of latching recesses of the tool connection element according to the disclosure.
Figure 3:
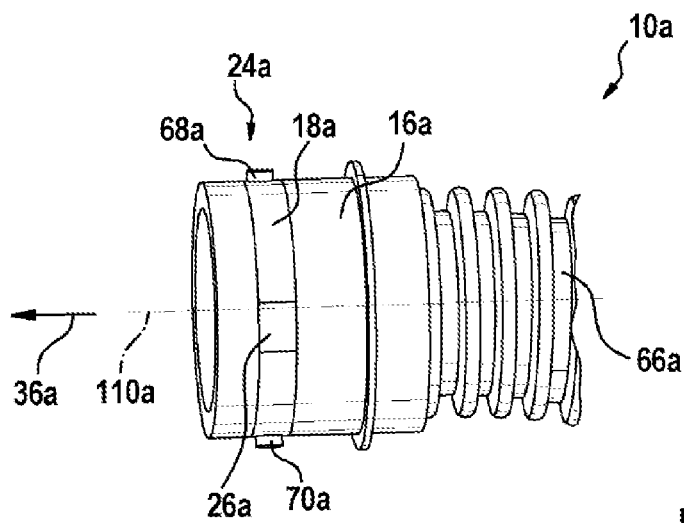
FIG. 3 is a schematic illustration, in a detail view, of a suction apparatus connection element according to the disclosure of an extraction connection system according to the disclosure.
Figure 4:
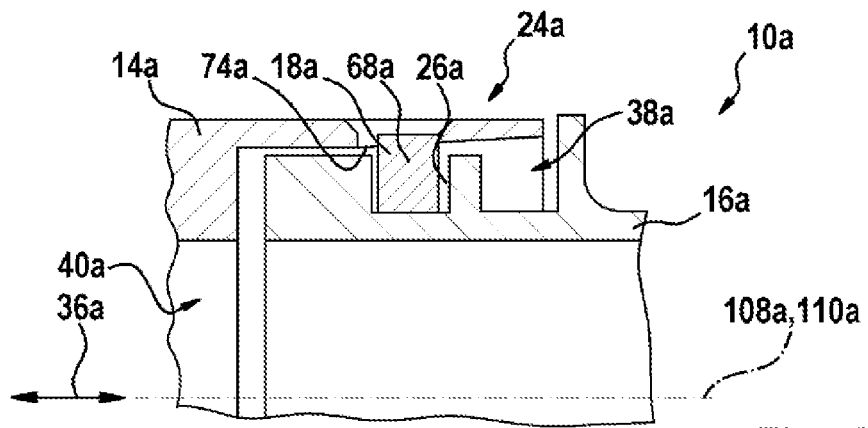
FIG. 4 is a schematic illustration, in a sectional view, of the tool connection element according to the disclosure and the suction apparatus connection element according to the disclosure in a state connected to each other.

FIG. 2b illustrates an alternative configuration of latching recesses 72a''' to the embodiment of the latching recesses 72a, 74a that is shown in FIG. 2a, wherein only one of the alternative latching recesses 72a''' is shown in FIG. 2b. In order to differentiate the exemplary embodiments from FIGS. 2a and 2b, triple apostrophes have been added to the reference numbers of the exemplary embodiment shown in FIG. 2b. The latching recesses 72a''' are arranged on a tool connection element 14a''' analogously to the latching recesses 72a, 74a shown in FIG. 2a. The alternative latching recesses 72a''' from FIG. 2b therefore substantially differ in a geometrical shape from the latching recesses 72a, 74a from FIG. 2a. The latching recesses 72a''' here in each case have a maximum longitudinal extent 112a''' that is larger than 6 mm, as viewed along a connecting direction of movement 36a''' of the tool connection element 14a''' or along a longitudinal axis 108a''' of the tool connection element 14a'''. The latching recesses 72a''' preferably each have a maximum longitudinal extent 112a''' that is greater than 9 mm, as viewed along the connecting direction of movement 36a''' of the tool connection element 14a''' or along the longitudinal axis 108a''' of the tool connection element 14a'''. An adaptation of the latching recesses 72a''' to a finger shape of an operator can therefore be achieved. In addition, the latching recesses 72a''' have a ratio of the maximum longitudinal extent 112a''' running along the connecting direction of movement 36a''' and a maximum width extent 114a''' running along an at least substantially perpendicularly to the connecting direction of movement 36a''' of 1:1 to 1:2.

The latching recesses 72a''' are bounded by in each case four side wall regions 116a''', 118a''', 120a''', 122a''', bounding the latching recesses 72a''', of the tool connection element 14a'''. A first side wall region 116a''' here runs in an arcuate manner, as viewed along a direction running at least substantially transversely with respect to the connecting direction of movement 36a'''. The arcuate first side wall region 116a''' has a profile corresponding to an edge region of a latching extension 68a, 70a shown in FIG. 3. Two further side wall regions 118a''', 120a''' which are directly adjacent to the first side wall region 116a''', which runs in an arcuate manner, run at an angle to each other and at an angle to the connecting direction of movement 36a''', as viewed along the connecting direction of movement 36a'''. The further side wall regions 118a''', 120a''' are directly adjacent here to the arcuate first side wall region 116a''' at two averted ends of the arcuate first side wall region 116a'''. In addition, a side wall region 122a''' connecting the two further side wall regions 118a''', 120a''', which run at an angle to each other, runs at least substantially perpendicularly to the connecting direction of movement 36a'''. The latching recesses 72a''' are therefore in each case bounded by a total of four side wall regions 116a''', 118a''', 120a''', 122a''' of the tool connection element 14a''', which side wall regions form, along a circumferential direction, a profile which is closed per se and bounds the respective latching recess 72a'''. The latching recesses 72a''' can be arranged here on the tool connection element 14a''' in a depression in an outer wall of the tool connection element 14a''' in a manner set back relative to the outer wall in the direction of an inner wall of the tool connection element 14a''' and can end with the inner wall of the tool connection element 14a''', or the latching recesses 72a''' extend flush from the outer wall in the direction of the inner wall until the latching recesses 72a''' end flush with the inner wall, as is illustrated in the case of the latching recesses 72a, 74 in FIG. 2a.

FIGS. 6 to 13 illustrate further alternative exemplary embodiments. Components, features and functions remaining substantially the same are basically numbered by the same reference numbers. In order to differentiate the exemplary embodiments, the letters a to d are added to the reference numbers of the exemplary embodiments. The description below is essentially restricted to the differences with respect to the first exemplary embodiment described in FIGS. 1 to 5, wherein reference can be made with regard to components, features and functions which remain the same to the description of the first exemplary embodiment in FIGS. 1 to 5.

Figure 6A:
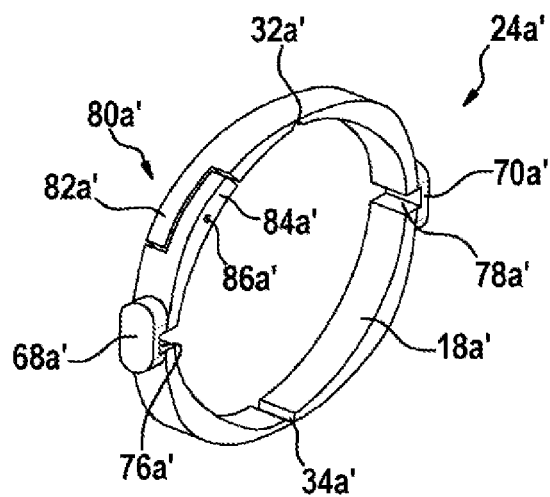
FIG. 6a is a schematic illustration, in a detail view, of an alternative fixing element of the fixing unit of the extraction connection system according to the disclosure.

FIG. 6a shows a fixing element 18a', formed in an alternative manner to the fixing element 18a, of an alternative fixing unit 24a'. The fixing element 18a' is arrangeable here on the suction apparatus connection element 16a at least substantially analogously to the fixing element 18a from FIGS. 1 to 5. Therefore, only the differences of the fixing element 18a' with respect to the fixing element 18a from FIGS. 1 to 5 are described in more detail here. In a mounted state, the fixing element 18a' has a circular-ring-shaped configuration. The fixing element 18a' therefore extends along an angular range of 360° in a mounted state. The fixing element 18a' comprises at least one articulation region 32a'. The articulation region 32a' is arranged between latching extensions 68a', 70a', as viewed along a circumferential direction of the fixing element 18a'. Overall, the fixing element 18a' has two articulation regions 32a', 34a'. The articulation regions 32a', 34a' are in the form of film hinge regions. The articulation regions 32a', 34a' here are in each case arranged between the latching extensions 68a', 70a', as viewed along the circumferential direction of the fixing element 18a'. An articulation region 32a', 34a' therefore in each case follows one of the latching extensions 68a', 70a' along the circumferential direction of the fixing element 18a'.

Furthermore, the fixing element 18a' comprises two further articulation regions 76a', 78a'. The further articulation regions 76a', 78a' are in the form of a film hinge region. The further articulation regions 76a', 78a' are arranged here on the latching extensions 68a', 70a'. A flexurally rigid region and a flexurally soft region are therefore arranged directly following each other in an alternating manner along the circumferential direction of the fixing element 18a', along an entire circumference of the fixing element 18a'. By this means, actuation of one of the latching extensions 68a', 70a' causes the other of the latching extensions 68a', 70a' to move at the same time. Only one of the latching extensions 68a', 70a' therefore has to be actuated to form a connection or to release the connection between the tool connection element 14a and the suction apparatus connection element 16a.

In addition, the fixing element 18a' has a mounting region 80a'. The mounting region 80a' comprises two mounting limbs 82a', 84a' which are formed separately from each other and are fastenable to each other by means of a fastening element 86a' of the fixing unit 24a'. The fastening element 86a' is in the form of a fastening pin which is integrally formed on one of the mounting limbs 82a', 84a'. The fastening element 86a' is provided for connecting the mounting limbs 82a', 84a' to each other along an axial direction about which the circumferential direction runs. The fastening element 86a', together with the mounting limb 82a', on which the fastening element 86a' is integrally formed, is moved here along the axial direction until the fastening element 86a' is arranged in a recess of the mounting limb 84a', which is formed in a manner decoupled from the fastening element 86a', and the mounting limbs 82a', 84a' are fastened to each other. However, it is also conceivable for the fastening element 86a' to have a different configuration appearing expedient to a person skilled in the art, for example a configuration in the form of a fastening latching element, as a fastening clamp element, etc.

Figure 6B:
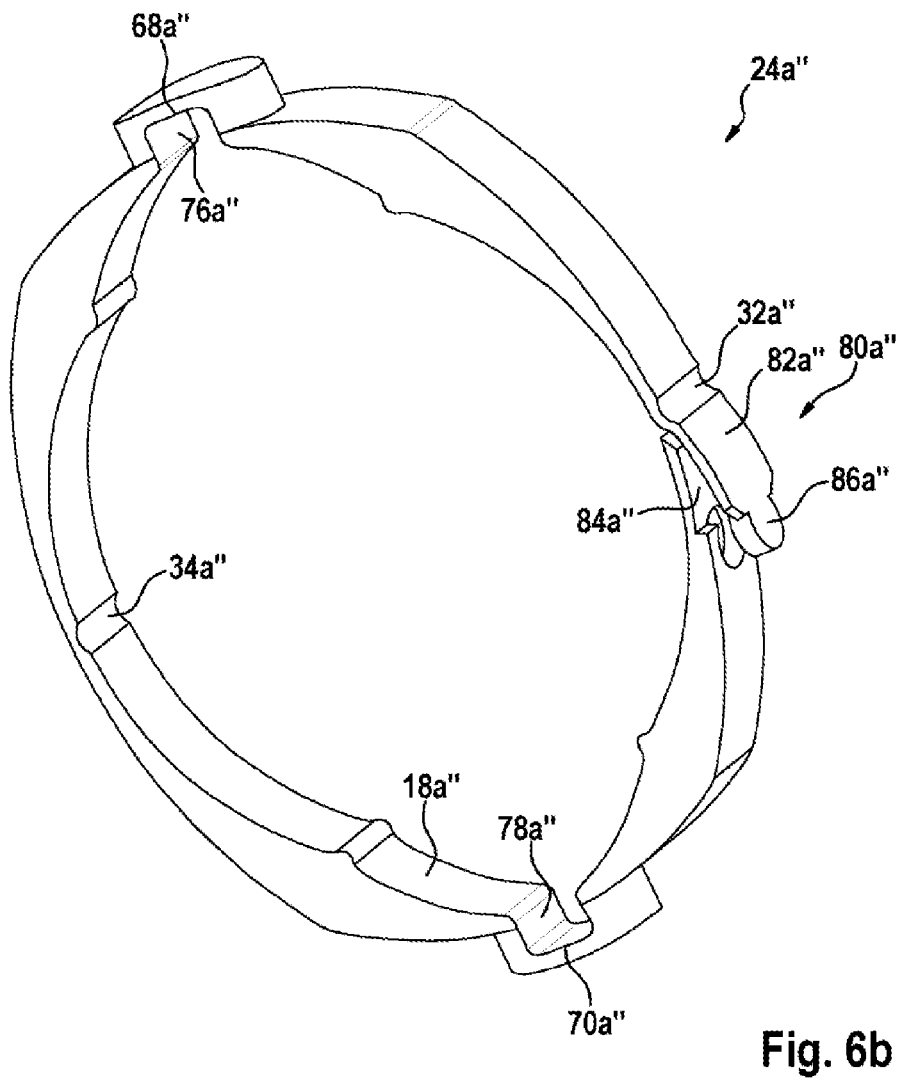
FIG. 6b is a schematic illustration, in a detail view, of a further alternative fixing element of the fixing unit of the extraction connection system according to the disclosure.

FIG. 6b shows an alternative fastening element 86a'', to the fastening element 86a' from FIG. 6a, of a fixing element 18a'' of an alternative fixing unit 24a''. The fixing element 18a'' is formed here at least substantially analogously to the fixing element 18a' from FIG. 6a. Only the differences between the fastening element 86a' from FIG. 6a and the alternative fastening element 86a'' are therefore described in more detail here. The fastening element 86a'' is in the form of a radial interlocking extension which is integrally formed on a mounting limb 82a'', 84a'' of the fixing element 18''. The fastening element 86a'' is provided for connecting the mounting limbs 82a'', 84a'' to each other along a radial direction running at least substantially perpendicularly to a circumferential direction of the fixing element 18a''. In addition, the radial direction runs substantially perpendicularly to an axial direction about which the circumferential direction runs. For connection of the mounting limbs 82a'', 84a'', the fastening element 86a'' together with the mounting limb 82a'', on which the fastening element 86a'' is integrally formed, is moved along the radial direction until the fastening element 86a'' is arranged in a recess of the mounting limb 84a'', which is formed in a manner decoupled from the fastening element 86a'', and the mounting limbs 82a'', 84a'' are fastened to each other.

Figure 7:
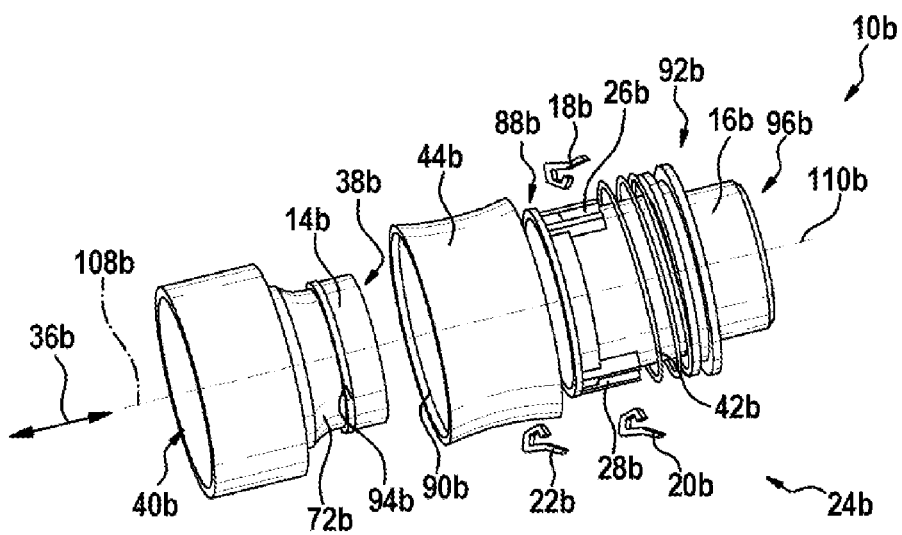
FIG. 7 is a schematic illustration, in an exploded view, of an alternative extraction connection system according to the disclosure.

FIG. 7 shows an alternative extraction connection system 10b. As an alternative to the extraction connection system 10a described in FIGS. 1 to 5, the extraction connection system 10b is arrangeable on the portable machine tool 12a described in FIGS. 1 to 5 and on the dust extraction device 46a described in FIGS. 1 to 5. The extraction connection system 10b for portable machine tools (not illustrated specifically here) comprises at least one tool connection element 14b and at least one suction apparatus connection element 16b, which are provided for connecting to each other. Furthermore, the extraction connection system 10b comprises at least one fixing unit 24b, which comprises at least one movably mounted fixing element 18b, 20b, 22b, for fixing the tool connection element 14b and the suction apparatus connection element 16b against a movement relative to each other in at least one direction. Overall, the fixing unit 24b comprises three movably mounted fixing elements 18b, 20b, 22b. However, it is also conceivable for the fixing unit 24b to comprise a number of fixing elements 18b, 20b, 22b differing from three.

Figure 8:
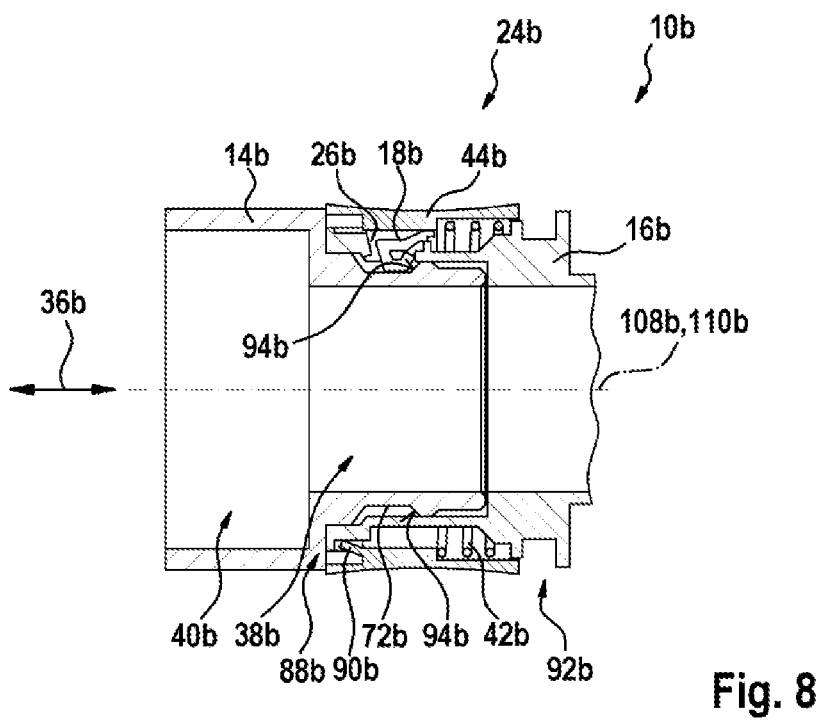
FIG. 8 is a schematic illustration, in a sectional view, of the alternative extraction connection system according to the disclosure.
Figure 10:
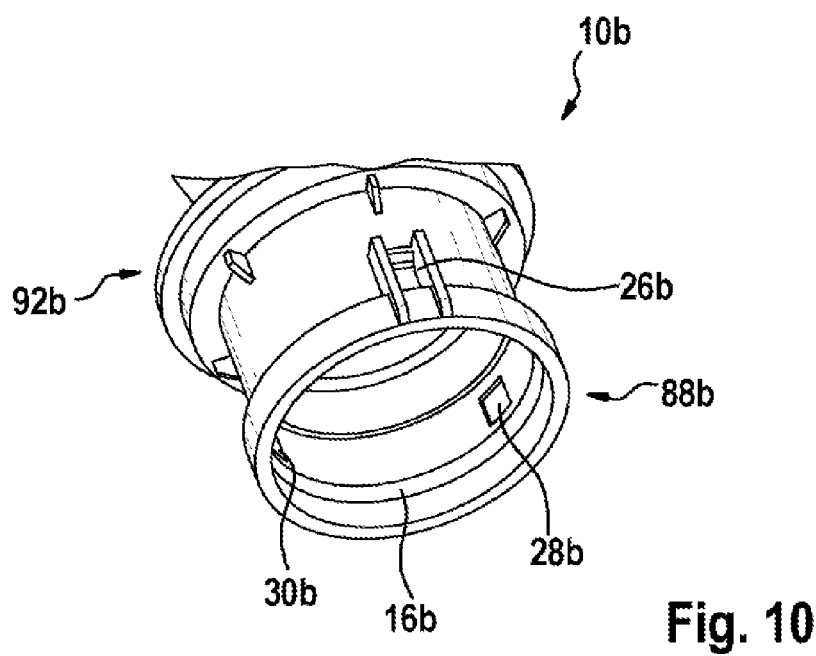
FIG. 10 is a schematic illustration, in a detail view, of a suction apparatus connection element according to the disclosure of the alternative extraction connection system according to the disclosure.

The fixing elements 18b, 20b, 22b are mounted movably on the suction apparatus connection element 16b. The fixing elements 18b, 20b, 22b are in each case arranged here in a receiving recess 26b, 28b, 30b of the suction apparatus connection element 16b (FIGS. 7 and 10). The fixing elements 18b, 20b, 22b at least partially reach through the receiving recess 26b, 28b, 30b in a fixed state of the tool connection element 14b and the suction apparatus connection element 16b. Furthermore, the fixing elements 18b, 20b, 22b are in the form of latching hooks. In a fixed state of the tool connection element 14b and of the suction apparatus connection element 16b, the fixing elements 18b, 20b, 22b latch here in a latching recess 72b of the tool connection element 14b (FIG. 8). The latching recess 72b of the tool connection element 14b is in the form of an annular groove. In a fixed state of the tool connection element 14b and the suction apparatus connection element 16b, the fixing elements 18b, 20b, 22b therefore engage behind a web-shaped edge region of the tool connection element 14b, which edge region bounds the latching recess 72b, which is in the form of a groove. However, it is also conceivable for the latching recess 72b to have a different configuration appearing expedient to a person skilled in the art. As a consequence of the configuration of the latching recess 72b as an annular groove, rotation of the tool connection element 14b relative to the suction apparatus connection element 16b is ensured in a fixed state of the tool connection element 14b and the suction apparatus connection element 16b. The tool connection element 14b comprises at least two connecting regions 38b, 40b which are different from each other, as viewed along a connecting direction of movement 36b of the tool connection element 14b and/or of the suction apparatus connection element 16b. The latching recess 72b of the tool connection element 14b is arranged on an outer circumference of one of the connecting regions 38b, 40b.

Furthermore, the fixing unit 24b comprises at least one spring element 42b which acts upon an operating element 44b of the fixing unit 24b with a spring force. The spring element 42b is in the form of a helical compression spring. In order for the operating element 44b to be acted upon with a spring force, the spring element 42b is supported at one end of the suction apparatus connection element 16b and the spring element 42b is supported on the operating element 44b at another end. The operating element 44b is of annular design. The operating element 44b here is in the form of an operating sleeve. The operating element 44b thus extends along a circumferential direction of the suction apparatus connection element 16b along an angular region of 360° about the suction apparatus connection element 16b. In order to limit a movement of the operating element 44b as a consequence of a spring force of the spring element 42, the suction apparatus connection element 16b has a web-shaped stop region 88b. The operating element 44b has a stop extension 90b which, in at least one state, interacts with the stop region 88b in order to limit a movement of the operating element 44b in at least one direction (FIG. 8). The suction apparatus connection element 16b furthermore has a further stop region 92b which is provided for interacting with the operating element 44b in order to limit a movement of the operating element 44b when the operating element 44b moves counter to a spring force of the spring element 42b. The further stop region 92b is of web-shape design and is arranged on the suction apparatus connection element 16b in a manner offset parallel to the stop region 88b.

In order to release a fixing of the tool connection element 14b and of the suction apparatus connection element 16b, the fixing unit 24b comprises at least the operating element 44b which, in at least one state, enables a movement option of the fixing elements 18b, 20b, 22b into a release position. In order to enable a movement option of the fixing elements 18b, 20b, 22b into a release position, the operating element 44b is moved counter to a spring force of the spring element 42b until the operating element 44b strikes against the further stop region 92b. A clearance is thereby opened up between the operating element 44b and the fixing elements 18b, 20b, 22b. The tool connection element 14b has at least one fixing element decoupling surface 94b which, at least in one state, moves the fixing elements 18b, 20b, 22b into a release position (FIG. 8). The fixing element decoupling surface 94b is in the form of an oblique surface which is integrally formed on an edge region bounding the latching recess 72b. Thus, as a consequence of the suction apparatus connection element 16b being pulled off from the tool connection element 14b, the fixing elements 18b, 20b, 22b are moved into a release position by means of interaction of oblique surfaces of the fixing elements 18b, 20b, 22b, the oblique surfaces corresponding to the fixing element decoupling surface 94b.

Figure 9:
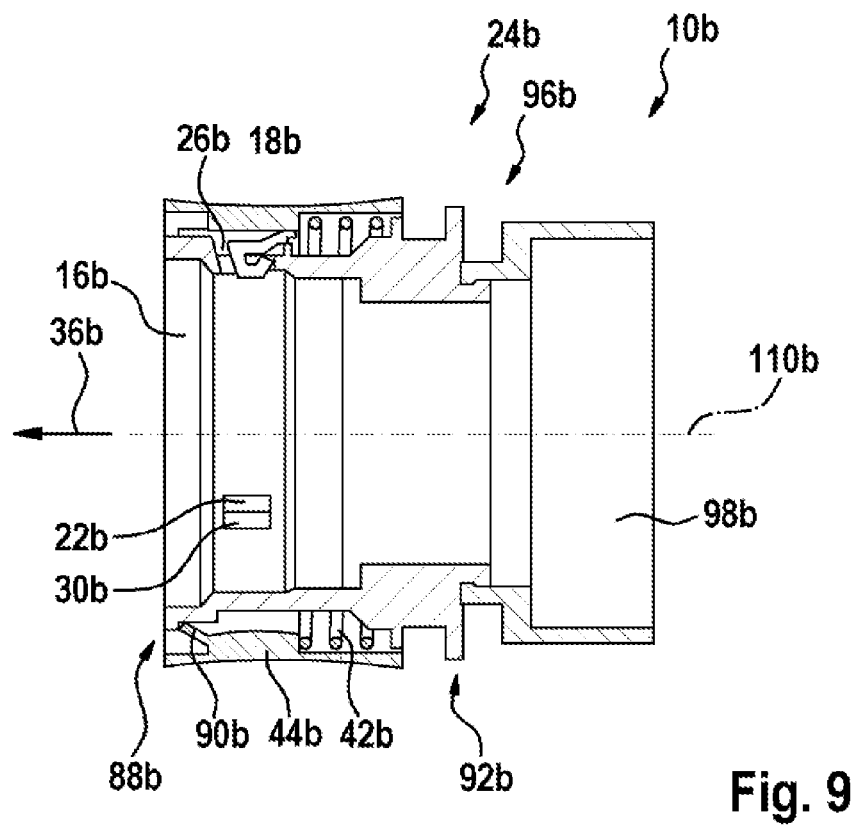
FIG. 9 is a schematic illustration, in a further sectional view, of the alternative extraction connection system according to the disclosure.

Furthermore, the suction apparatus connection element 16b comprises a coupling region 96b for coupling an adapter element 98b of the extraction connection system 10b (FIG. 9). The adapter element 98b is provided in order to permit coupling of the suction apparatus connection element 16b to dust extraction hoses of a dust extraction device (not illustrated specifically here). Adapter elements 98b which differ in design and permit coupling of the suction apparatus connection element 16b to various dust extraction hoses (not illustrated specifically here) can be arranged here on the coupling region 96b. However, it is also conceivable for the suction apparatus connection element 16b to be arranged on a dust extraction hose in a manner decoupled from the adapter element 98b. The coupling region 96b is in the form in this case of an interlocking and/or frictional coupling region.

Figure 11:
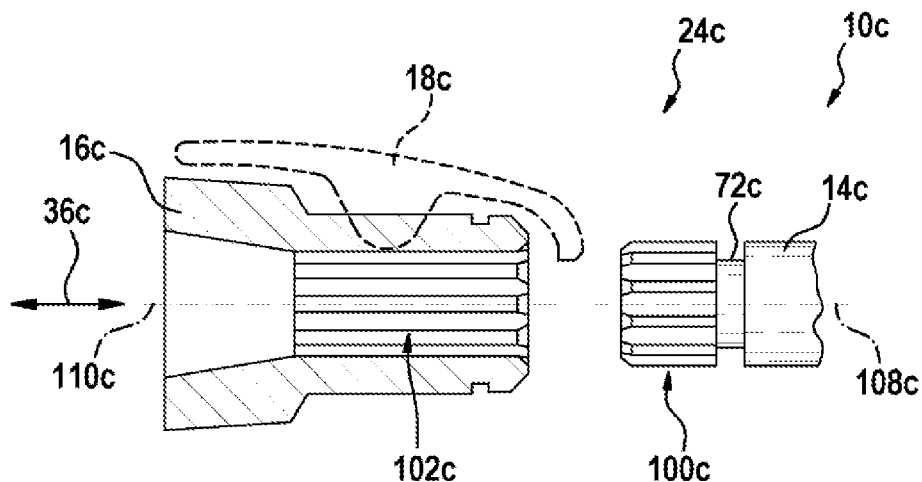
FIG. 11 is a schematic illustration, in a detail view, of a further alternative extraction connection system according to the disclosure.

FIG. 11 shows a further alternative extraction connection system 10c. The extraction connection system 10c is arrangeable on the portable machine tool 12a described in FIGS. 1 to 5 and on the dust extraction device 46a described in FIGS. 1 to 5 as an alternative to the extraction connection system 10a described in FIGS. 1 to 5. The extraction connection system 10c for portable machine tools (not illustrated specifically here) comprises at least one tool connection element 14c and at least one suction apparatus connection element 16c, which are provided in order to be connected to each other. Furthermore, the extraction connection system 10c comprises at least one fixing unit 24c, which comprises at least one movably mounted fixing element 18c, for fixing the tool connection element 14c and the suction apparatus connection element 16c against a movement relative to each other in at least one direction. The fixing element 18c is mounted movably on the suction apparatus connection element 16c. The fixing element 18c here is in the form of a latching lever.

The tool connection element 14c has an interlocking connecting region 100c. The interlocking connecting region 100c of the tool connection element 14c is arranged on an outer circumference of the tool connection element 14c. The interlocking connecting region 100c of the tool connection element 14c here is in the form of a splined shaft connecting region. The suction apparatus connection element 16c comprises an interlocking connecting region 102c corresponding to the interlocking connecting region 100c of the tool connection element 14c.

The interlocking connecting region 102c of the suction apparatus connection element 16c is therefore in the form of a splined shaft connecting region. The interlocking connecting region 102c of the suction apparatus connection element 16c is arranged here on an inner circumference of the suction apparatus connection element 16c. However, it is also conceivable for the interlocking connecting region 100c of the tool connection element 14c and for the interlocking connecting region 102c of the suction apparatus connection element 16c to have a different configuration appearing expedient to a person skilled in the art, for example a configuration in the form of an adjustment spring connecting region, etc.

Alternatively, the tool connection element 14c and the suction apparatus connection element 16c could be designed as ball and socket joint elements which are insertable one into the other and could be fixed on each other by means of a fixing element 18c mounted in the form of a tightening strap on the suction apparatus connection element 16c in a movable manner. It is conceivable here for the tightening strap to be tightened merely to an extent such that a movement of the tool connection element 14c and of the suction apparatus connection element 16c is possible in a connected state, but release of a connection between the tool connection element 14c and the suction apparatus connection element 16c is prevented.

Figure 12:
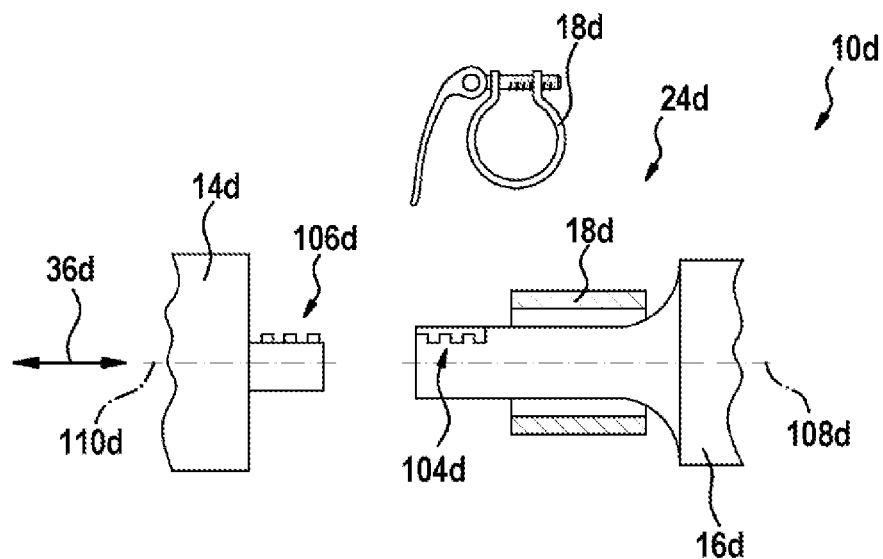
FIG. 12 is a schematic illustration, in a detail view, of a further alternative extraction connection system according to the disclosure.

FIG. 12 shows a further alternative extraction connection system 10d. The extraction connection system 10d is arrangeable on the portable machine tool 12a described in FIGS. 1 to 5 and on the dust extraction device 46a described in FIGS. 1 to 5 as an alternative to the extraction connection system 10a described in FIGS. 1 to 5. The extraction connection system 10d for portable machine tools (not illustrated specifically here) comprises at least one tool connection element 14d and at least one suction apparatus connection element 16d, which are provided in order to be connected to each other. Furthermore, the extraction connection system 10d comprises at least one fixing unit 24d, which comprises at least one movably mounted fixing element 18d, for fitting the tool connection element 14d and the suction apparatus connection element 16d against a movement relative to each other in at least one direction. The fixing element 18d is mounted movably on the suction apparatus connection element 16d. The fixing element 18d here is in the form of a tightening strap.

The suction apparatus connection element 16d is formed from an elastic plastic which is pushable onto the tool connection element 14d or is pullable over the tool connection element 14d. Furthermore, the suction apparatus connection element 16d comprises, on an inner circumference, a toothing 104d running along a longitudinal axis of the suction apparatus connection element 16d. The tool connection element 14d comprises, on an outer circumference of the tool connection element 14d, a toothing 106d which corresponds to the toothing 104d of the suction apparatus connection element 16d and runs along a longitudinal axis of the tool connection element 14d. After the tool connection element 14d and the suction apparatus connection element 16d are connected, the fixing element 18d, which is in the form of a tightening strap, is tightened in order to fix the tool connection element 14d and the suction apparatus connection element 16d.

What is claimed is:

1. A dust extraction system, comprising:
    a suction apparatus connection element including:
        a first end portion configured to operably connect to a dust extraction hose;
        a second end portion configured to removably couple with a tool connection element connected to a portable machine tool; and
        an annular receiving recess at a location between the first end portion and the second end portion;
    a resilient annular fixing element positioned at least partially within the annular receiving recess;
    a first radial latching extension extending radially outwardly from the resilient annular fixing element; and
    a second radial latching extension extending radially outwardly from the resilient annular fixing element,
    wherein the resilient annular fixing element is movable between
        a first position whereat the first radial latching extension engages a first latching recess in the tool connection element when the second end portion is operably coupled to the tool connection element, and
        a second position whereat the first radial latching extension does not engage the first latching recess when the second end portion is operably coupled to the tool connection element,
    wherein the resilient annular fixing element is resiliently biased toward the first position,
    wherein tool connection element defines a longitudinal axis,
    wherein the first latching recess defines a maximum longitudinal extent along the longitudinal axis,
    wherein the first radial latching extension defines a maximum longitudinal extent along the longitudinal axis,
    wherein the maximum longitudinal extent of the first latching recess is greater than the maximum longitudinal extent of the first radial latching extension, such that when the resilient annular fixing element is in the first position each of (i) the resilient annular fixing element, (ii) the first radial latching extension, (iii) the second radial latching extension, and (iv) the suction apparatus connection element is movable relative to the tool connection element along the longitudinal axis,
    wherein the second radial latching extension engages a second latching recess in the tool connection element when the second end portion is operably coupled to the tool connection element and the resilient annular fixing element is in the first position, and
    wherein the second radial latching extension does not engage the second latching recess in the tool connection element when the second end portion is operably coupled to the tool connection element and the resilient annular fixing element is in the second position.

2. The dust extraction system of claim 1, wherein the resilient annular fixing element is rotatable with respect to the suction apparatus connection element when the second end portion is operably coupled to the tool connection element and the resilient annular fixing element is in the first position.

3. The dust extraction system of claim 1, wherein the first radial latching extension and the second radial latching extension are distributed regularly over a circumference of the resilient annular fixing element.

4. The dust extraction system of claim 1, wherein the first radial latching extension is actuatable to move the resilient annular fixing element to the second position.

5. The dust extraction system of claim 1, wherein the tool connection element includes:
a first end portion configured to operatively connect to the portable machine tool; and
a second end portion configured to removably couple to the second end portion of the suction apparatus connection element.

6. The dust extraction system of claim 5, wherein the first end portion of the tool connection element has an internal diameter that is smaller than an internal diameter of the second end portion of the tool connection element.

7. The dust extraction system of claim 1, wherein:
the first latching recess extends through an outside surface of the tool connection element so as to provide access to the first radial latching extension when the suction apparatus connection element is coupled to the tool connection element; and
the first radial latching extension is actuatable via the first latching recess to move the resilient annular fixing element to the second position.

8. The dust extraction system of claim 1, wherein the first latching recess has an oval shaped cross-section.

9. The dust extraction system of claim 1, wherein the resilient annular fixing element extends over less than an entirety of a circumference of the annular receiving recess.

10. The dust extraction system of claim 1, wherein the annular receiving recess is an annular groove with parallel side-walls.

11. The dust extraction system of claim 1, further comprising:
a dust extraction device including the dust extraction hose and a collecting container.

12. A dust extraction system, comprising:
a suction apparatus connection element that includes:
a first end portion configured to operatively connect to a dust extraction hose;
a second end portion; and
an annular receiving recess located between the first end portion and the second end portion;
a tool connection element that includes:
a first end portion configured to operatively connect with a portable power tool;
a second end portion configured to removably receive the second end portion of the suction apparatus connection element; and
a first coupling portion extending from the second end portion toward the first end portion, the first coupling portion having a first latching recess and a second latching recess;
a resilient annular fixing element positioned at least partially within the annular receiving recess;
a first radial latching extension extending radially outwardly from the resilient annular fixing element; and
a second radial latching extension extending radially outwardly from the resilient annular fixing element,
wherein the first radial latching extension is movable between
a first position whereat the first radial latching extension engages the first latching recess in the first coupling portion when the second end portion of the suction apparatus connection element is received in the second end portion of the tool connection element to operatively couple the tool connection element with the suction apparatus connection element, and
a second position whereat the first radial latching extension does not engage the first latching recess when the second end portion of the suction apparatus connection element is received in the second end portion of the tool connection element;
wherein the resilient annular fixing element is resiliently biased toward the first position,
wherein tool connection element defines a longitudinal axis,
wherein the first latching recess defines a maximum longitudinal extent along the longitudinal axis,
wherein the first radial latching extension defines a maximum longitudinal extent along the longitudinal axis,
wherein the maximum longitudinal extent of the first latching recess is greater than the maximum longitudinal extent of the first radial latching extension, such that when the resilient annular fixing element is in the first position each of (i) the resilient annular fixing element, (ii) the first radial latching extension, (iii) the second radial latching extension, and (iv) the suction apparatus connection element is movable relative to the tool connection element along the longitudinal axis,
wherein the second radial latching extension engages the second latching recess in the tool connection element when the second end portion is operably coupled to the tool connection element and the resilient annular fixing element is in the first position, and
wherein the second radial latching extension does not engage the second latching recess in the tool connection element when the second end portion is operably coupled to the tool connection element and the resilient annular fixing element is in the second position.

13. The dust extraction system of claim 12, wherein the resilient annular fixing element, together with the tool connection element, is rotatable with respect to the suction apparatus connection element when the tool connection element is operably coupled with the suction apparatus connection element and the resilient annular fixing element is in the first position.

14. The dust extraction system of claim 12, wherein:
the first radial latching extension and the second radial latching extension are distributed regularly over a circumference of the resilient annular fixing element.

15. The dust extraction system of claim 12, wherein the first radial latching extension is actuatable to move the resilient annular fixing element to the second position.

16. The dust extraction system of claim 15, wherein the first latching recess provides access from an interior of the tool connection element to an exterior of the tool connection element such that, when the tool connection element is operatively coupled to the suction apparatus connection element with the resilient annular fixing element in the first position, the first radial latching extension is actuatable from the exterior of the tool connection element via the first latching recess.

17. The dust extraction system of claim 12, where in the resilient annular fixing element extends over less than an entirety of a circumference of the annular receiving recess.

18. The dust extraction system of claim 12, wherein the first latching recess has an oval shaped cross-section.

19. The dust extraction system of claim 12, wherein the tool connection element further defines a second coupling portion extending from the first end portion of the tool connection element toward the first coupling portion, the second coupling portion having an internal diameter that is smaller than an internal diameter of the first coupling portion.

20. The dust extraction system of claim 12, further comprising:

a dust extraction device including the dust extraction hose and a collecting container.

* * * * *